United States Patent
Zhang et al.

(10) Patent No.: US 9,537,421 B2
(45) Date of Patent: *Jan. 3, 2017

(54) MULTILEVEL CONVERTER

(71) Applicant: GENERAL ELECTRIC COMPANY, Schenectady, NY (US)

(72) Inventors: Di Zhang, Niskayuna, NY (US); Dong Dong, Schenectady, NY (US); Andrew Allen Rockhill, Mechanicville, NY (US)

(73) Assignee: General Electric Company, Niskayuna, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/465,887

(22) Filed: Aug. 22, 2014

(65) Prior Publication Data

US 2016/0056728 A1 Feb. 25, 2016

(51) Int. Cl.
*H02M 7/487* (2007.01)
*H02M 7/483* (2007.01)
*H02M 7/49* (2007.01)

(52) U.S. Cl.
CPC .......... *H02M 7/487* (2013.01); *H02M 7/483* (2013.01); *H02M 7/49* (2013.01); *H02M 2007/4835* (2013.01)

(58) Field of Classification Search
CPC ........ H02M 7/483; H02M 7/487; H02M 7/49; H02M 2007/4835
See application file for complete search history.

(56) References Cited

U.S. PATENT DOCUMENTS

| 5,644,483 | A | * | 7/1997 | Peng | ............. | H02M 7/487 363/132 |
| 6,480,403 | B1 | | 11/2002 | Bijlenga | | |
| 8,559,204 | B2 | | 10/2013 | Badger et al. | | |
| 2006/0056209 | A1 | * | 3/2006 | Blidberg | ............. | H02M 7/487 363/63 |

(Continued)

FOREIGN PATENT DOCUMENTS

| CN | 102611345 A | 7/2012 |
| CN | 102832841 A | 12/2012 |

(Continued)

OTHER PUBLICATIONS

Staffan et al., "Decoupled Steady-State Model of the Modular Multilevel Converter With Half-Bridge Cells", Power Electronics, Machines and Drives (PEMD 2012), 6th IET International Conference on, pp. 1-6, Mar. 27-29, 2012.

(Continued)

*Primary Examiner* — Fred E Finch, III
*Assistant Examiner* — Rafael O De León Domenech
(74) *Attorney, Agent, or Firm* — Nitin N. Joshi

(57) ABSTRACT

A power converter includes at least one leg having a first string operatively coupled to a second string via a first connecting node and a second connecting node. The first string includes a first branch and a second branch operatively coupled via a third connecting node. Each of the branches has a plurality of switching units, a controllable semiconductor switch and the first connecting node and the second connecting node. The first string is operatively coupled across a first bus and a second bus. Furthermore, the second string includes a plurality of controllable semiconductor switches.

17 Claims, 8 Drawing Sheets

(56) References Cited

U.S. PATENT DOCUMENTS

| | | | |
|---|---|---|---|
| 2012/0127766 A1* | 5/2012 | Crookes | H02J 3/1857 363/126 |
| 2013/0082534 A1* | 4/2013 | Eckel | H02M 1/32 307/82 |
| 2013/0128636 A1 | 5/2013 | Trainer et al. | |
| 2013/0279211 A1* | 10/2013 | Green | H02M 7/49 363/35 |
| 2014/0002048 A1* | 1/2014 | Pang | H02M 11/00 323/304 |
| 2014/0092660 A1 | 4/2014 | Zhang et al. | |
| 2014/0092661 A1 | 4/2014 | Zhang et al. | |
| 2014/0146583 A1* | 5/2014 | Trainer | H02J 3/36 363/35 |

FOREIGN PATENT DOCUMENTS

| | | | | |
|---|---|---|---|---|
| CN | 102931863 A | 2/2013 | | |
| CN | 102969732 A | 3/2013 | | |
| CN | 103107725 A | 5/2013 | | |
| CN | 103151938 A | 6/2013 | | |
| CN | 202978804 U | 6/2013 | | |
| CN | 103248255 A | 8/2013 | | |
| SE | WO 2012163841 A1 * | 12/2012 | | H02J 3/36 |

OTHER PUBLICATIONS

Peng, "A Generalized Multilevel Inverter Topology with Self Voltage Balancing", IEEE Transactions on Industry Applications, Mar./Apr. 2001, pp. 611-618, vol. No. 37, Issue No. 2.

Nami et al., "Modular Multilevel Converters for HVDC Applications: Review on Converter Cells and Functionalities" IEEE Transactions on Power Electronics, Jan. 2015, pp. 18-36, vol. No. 30, Issue No. 1.

European Search Report and Opinion issued in connection with corresponding EP Application No. 15180880.5 on Feb. 4, 2016.

* cited by examiner

MULTILEVEL CONVERTER

BACKGROUND

The invention relates generally to power converters and more specifically to a multilevel converter.

In the last few decades, the field of power conversion has grown tremendously due to its imminent advantages in motor drives, renewable energy systems, high voltage direct current (HVDC) systems, and the like. For example, a subsea oil and gas production system which requires hundreds of megawatts of electric power may employ a HVDC transmission and distribution system for delivery of electric power. Such HVDC systems typically include a land-based or topside converter substation where the AC-to-DC power conversion is performed. The multilevel converter is emerging as a promising power conversion technology for such medium and high voltage applications.

Multilevel converters offer several advantages over ordinary two-level converters. For example, the power quality of the multilevel converter is better than that of two level converters. Also, the multilevel converters are ideal for interface between a grid and renewable energy sources such as photovoltaics (PV), fuel cells, wind turbines, and the like. In addition, the efficiency of the multilevel converter is relatively higher as a result of its minimum switching frequency.

In the recent times, the multilevel converters having a modular structure and without transformers have been designed. The modular structure of the converters, allows stacking of these converters to an almost unlimited number of levels. Also, the modular structure aids in scaling up to different power and voltage levels. However, certain currently available multilevel converters such as modular multilevel converters (MMC) typically employ a large number of fully controllable semiconductor switches, such as insulated gate bipolar transistors (IGBTs).

BRIEF DESCRIPTION

In accordance with an embodiment of the present technique, a power converter is presented. The power converter includes at least one leg with a first string and a second string. The first string comprises a first branch and a second branch. Each of the branches comprises a plurality of switching units and a controllable semiconductor switch, a first connecting node, and a second connecting node. The first string is operatively coupled across a first bus and a second bus and the second branch is operatively coupled to the first branch via a third connecting node. The second string is operatively coupled to the first string via the first connecting node and the second connecting node, wherein the second string comprises a plurality of controllable semiconductor switches.

In accordance with another embodiment of the present technique, a system for power conversion is presented. The system includes a power source, a load, a first power converter and a controller. The first power converter comprises one or more legs. Each of the one or more legs includes a first string and a second string. The first string comprises a first branch and a second branch each comprising a plurality of switching units and a controllable semiconductor switch, a first connecting node, and a second connecting node. The first string is operatively coupled across a first bus and a second bus and the second branch is operatively coupled to the first branch via a third connecting node. The second string is operatively coupled to the first string via the first connecting node and the second connecting node, wherein the second string comprises a plurality of controllable semiconductor switches. Furthermore, the controller is configured to control switching of the plurality of controllable semiconductor switches and the plurality of switching units.

In accordance with yet another embodiment of the present technique, a system for power conversion is presented. The system includes a power source, a load, a first power converter and a controller. The first power converter includes one or more legs, wherein each of the one or more legs comprises a first string and a second string. The first string is operatively coupled between a first bus and a second bus and includes a first branch and a second branch. Each branch includes a plurality of switching units and a controllable semiconductor switch, a first connecting node, and a second connecting node. The second branch is operatively coupled to the first branch via a third connecting node and the third connecting nodes of the one or more legs are operatively coupled to each other. The second string is operatively coupled to the first string via the first connecting node and the second connecting node, wherein the second string comprises a plurality of controllable semiconductor switches. Furthermore, the controller is further configured to control switching of the plurality of controllable semiconductor switches and a plurality of switching units.

DRAWINGS

Figure 1:
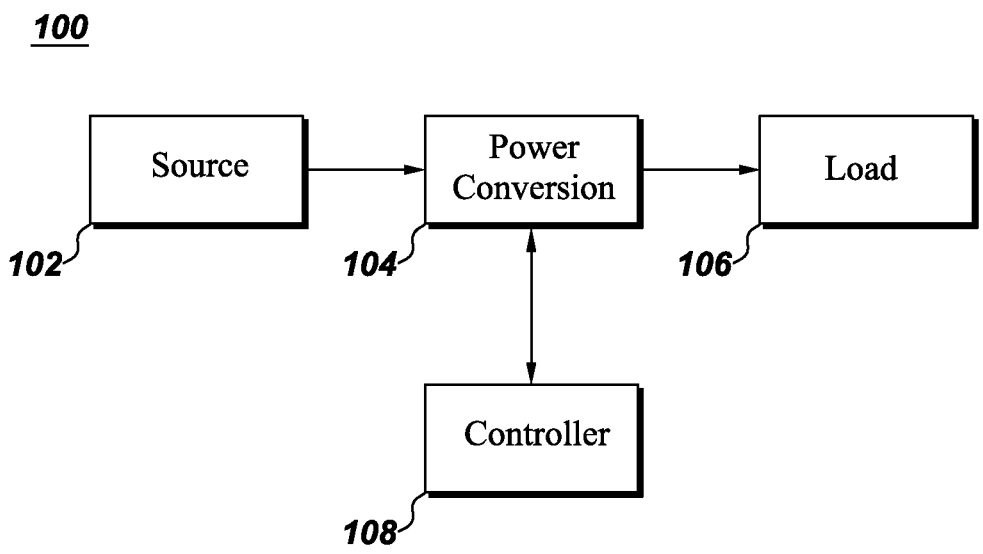
FIG. 1 is a diagrammatical representation of a system for power conversion.
Figure 2:
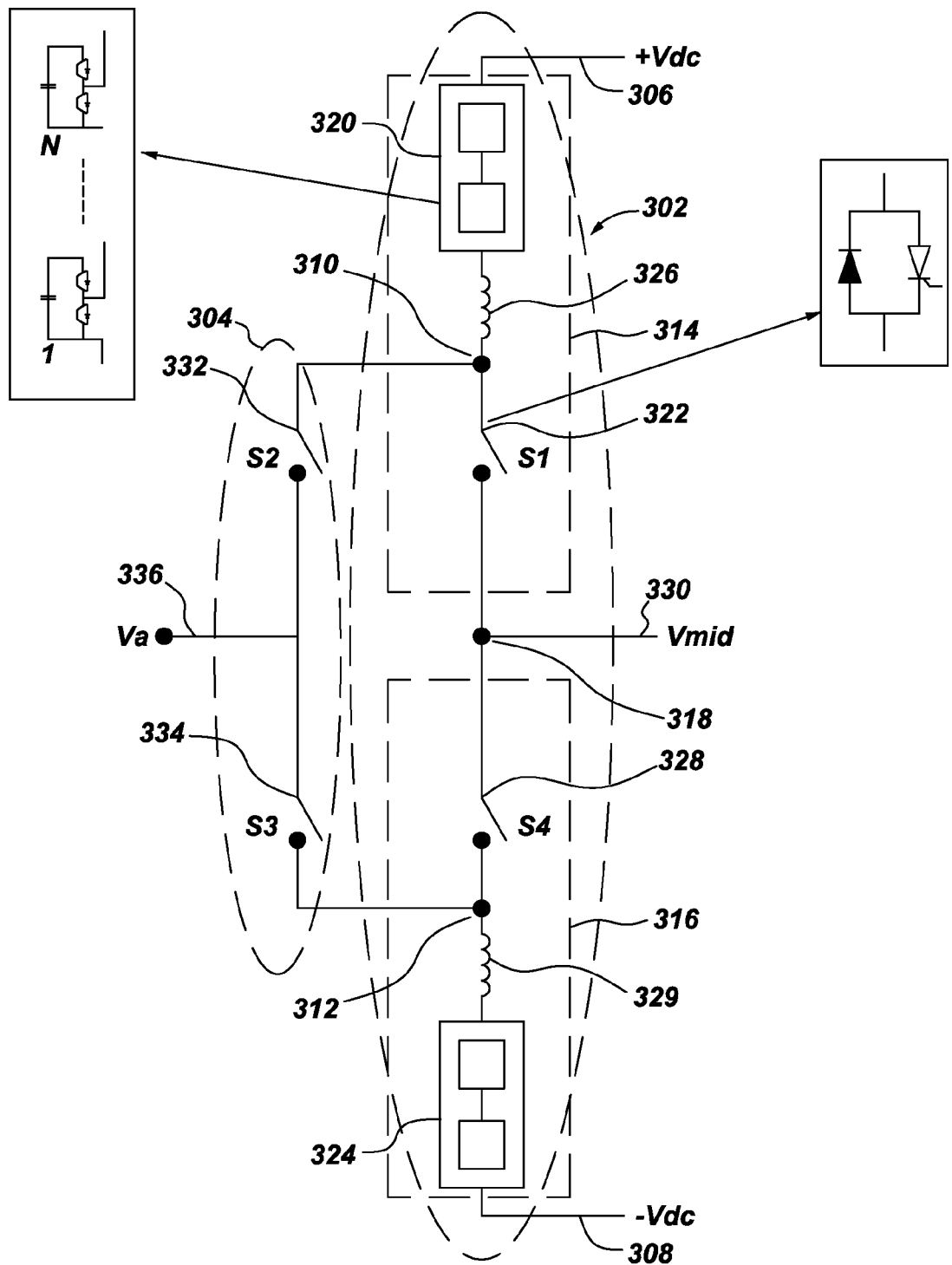
FIG. 2 is a diagrammatical representation of an exemplary embodiment of a portion of a power converter for use in the system of FIG. 1, according to aspects of the present disclosure.
Figure 5C:
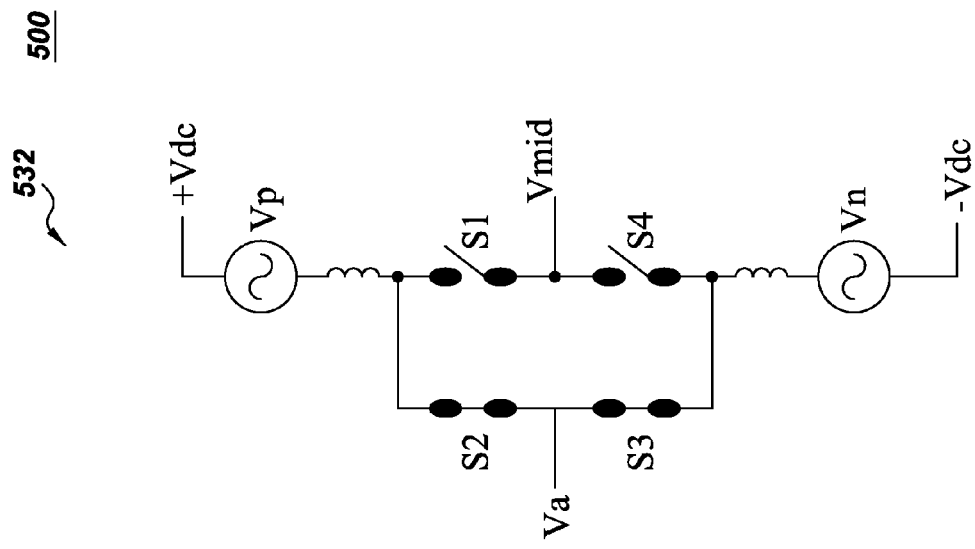
Figure 5B:
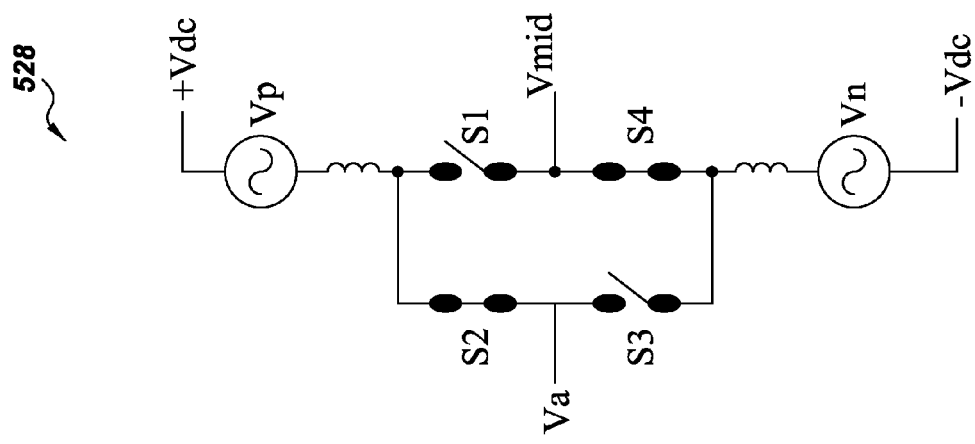
Figure 5A:
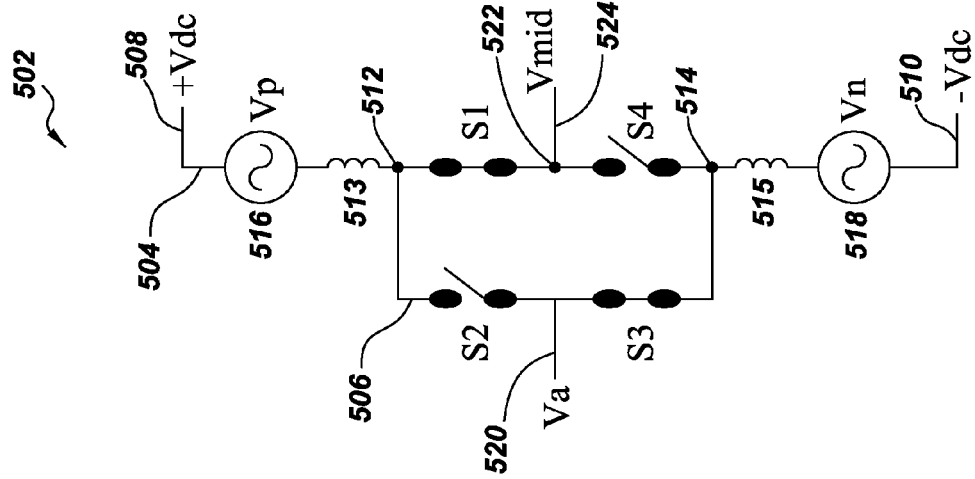
Figure 6:
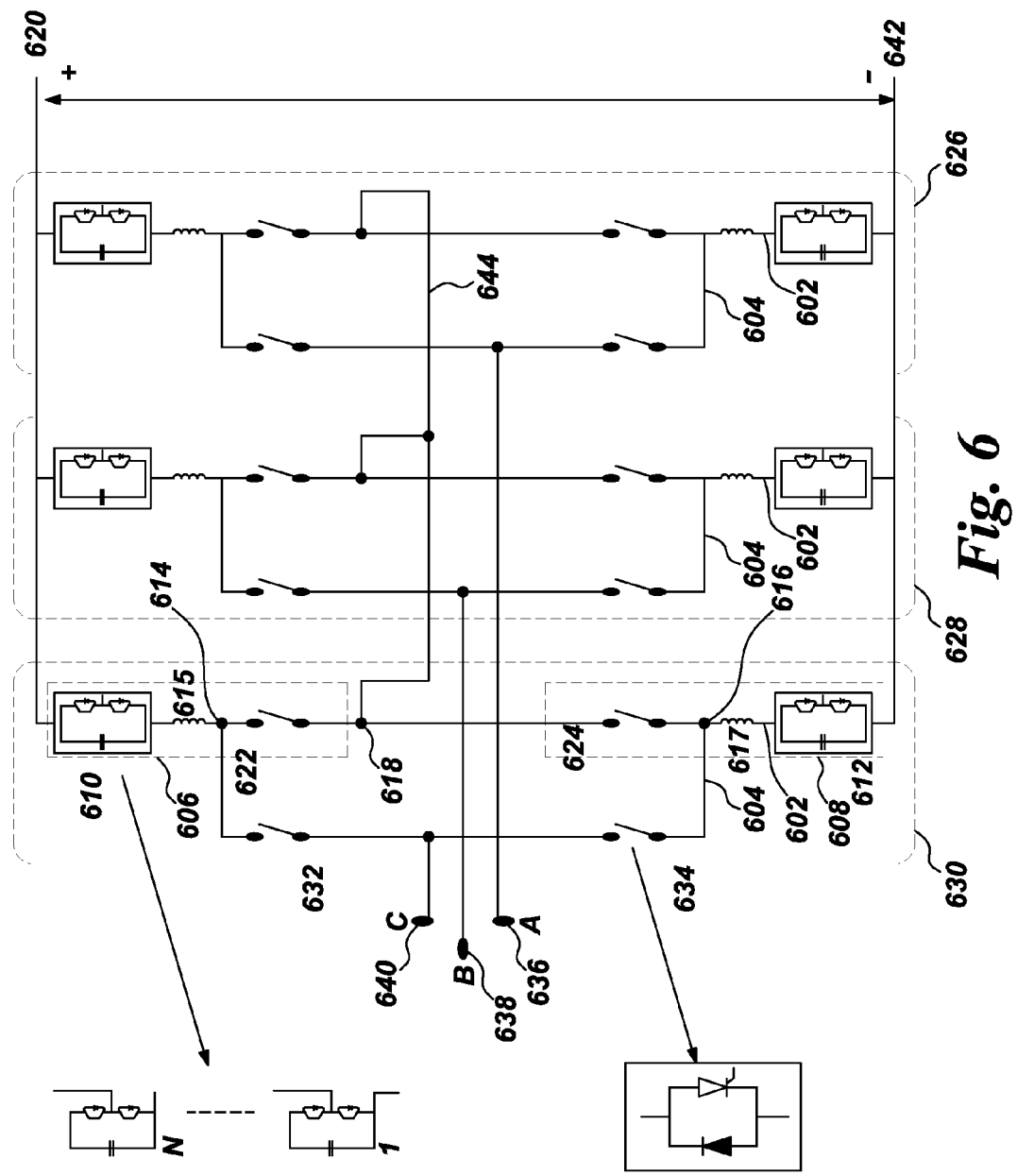
Figure 7:
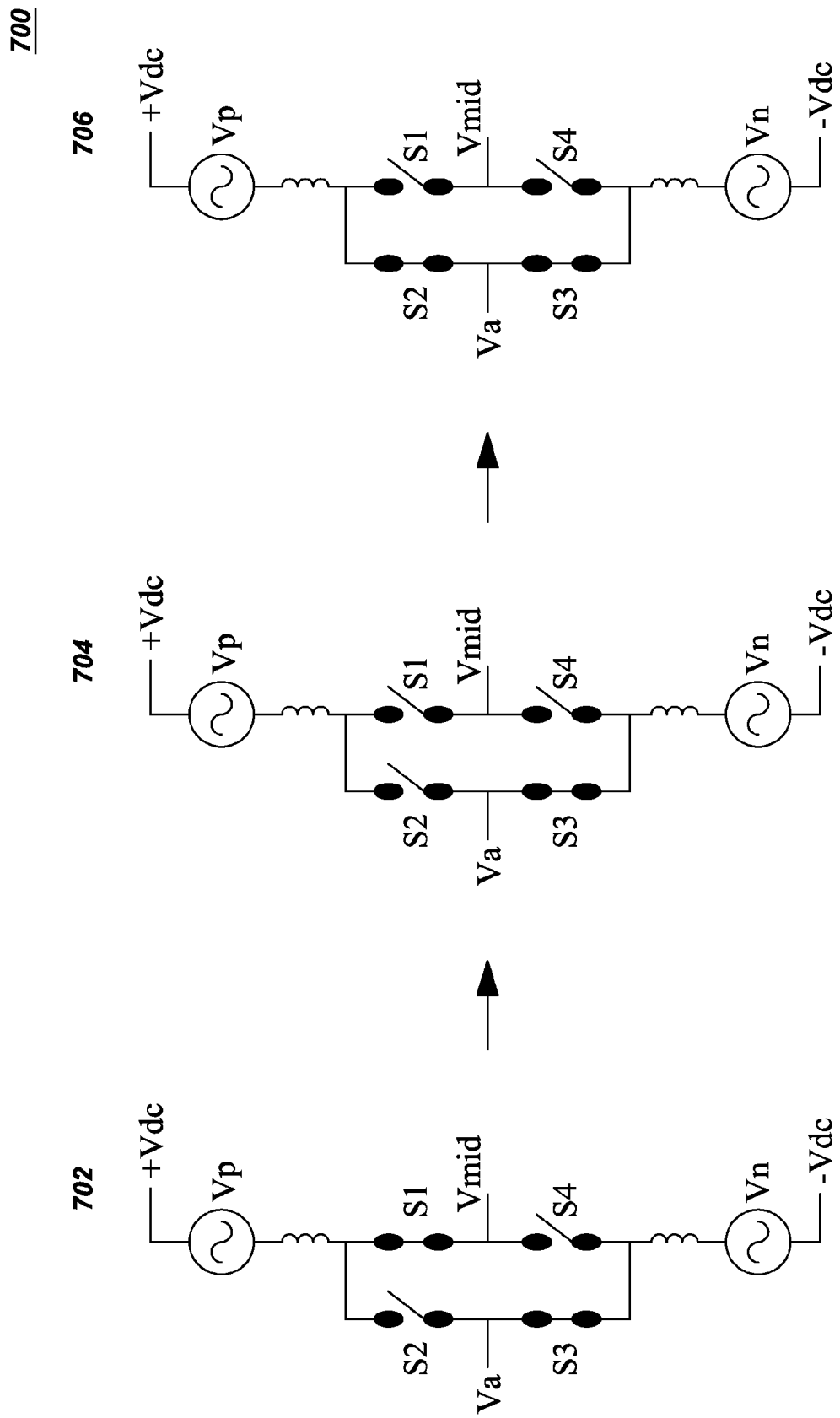
Figure 8:
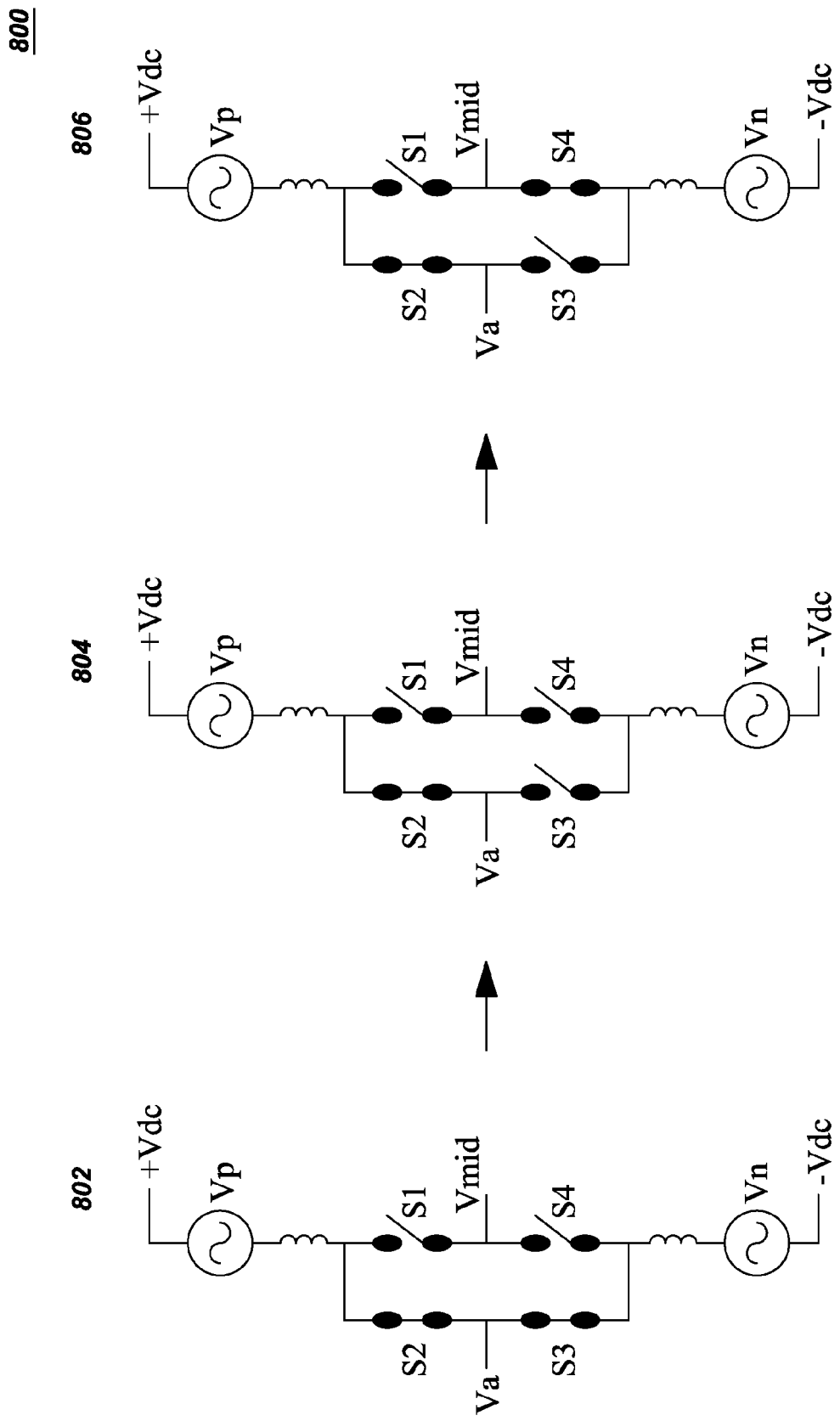

FIGS. 5(a)-5(c) are diagrammatical representations of different operating states of a leg of the power converter of FIG. 2, according to aspects of the present disclosure;

FIG. 6 is a diagrammatical representation of an exemplary embodiment of a three phase power converter for use in the system of FIG. 1, according to aspects of the present disclosure;

FIG. 7 is a diagrammatical representation of a transition of a converter leg from a positive operating state to a zero operating state, according to aspects of the present disclosure; and FIG. 8 is a diagrammatical representation of a transition of a converter leg from a zero operating state to a negative operating state, according to aspects of the present disclosure.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of an exemplary system for power conversion and method for power conversion are presented. By employing the power converter and the method for power conversion described hereinafter, a multilevel converter is provided. In one example, the power converter may include a modular multilevel converter.

Turning now to the drawings, by way of example in FIG. 1, a system 100 for converting power is depicted. In one embodiment, the system 100 for converting power may include a source 102, a power converter 104, and a grid/utility/load 106. The term source, as used herein, is used to refer to a renewable power source, a non-renewable power source, a generator, a grid, and the like. Also, the term load, as used herein, may be used to refer to a grid, an electrical appliance, and the like. In addition, the power converter 104 may be a multilevel converter. In one embodiment, the source 102 may be operatively coupled to a first terminal (not shown) of the power converter 104. A second terminal (not shown) of the power converter 104 may be operatively coupled to the load 106.

Also, the system 100 may include a controller 108. The controller 108 may be configured to control the operation of the power converter 104, in one embodiment. By way of example, the controller 108 may be configured to control the operation of the power converter 104 by controlling switching of a plurality of semiconductor switches of the power converter 104. Furthermore, in one embodiment, the system 100 may also include other circuit components (not shown) such as, but not limited to, a circuit breaker, an inductor, a compensator, a capacitor, a rectifier, a reactor, a filter, and the like.

Turning now to FIG. 2, a diagrammatical representation 300 of an exemplary embodiment of a portion of a power converter, such as the power converter 104 of FIG. 1, is depicted. In particular, a leg 300 of the power converter is depicted in the embodiment of FIG. 2. The leg 300 of the power converter may include a first string 302 and a second string 304. More particularly, the first string 302 may be operatively coupled to the second string 304 to form the leg 300. Furthermore, the first string 302 may be operatively coupled between a first bus 306 and a second bus 308. In one embodiment, the first bus 306 may include a positive DC bus and the second bus 308 may include a negative DC bus. The second string 304 may be operatively coupled to the first string 302 via a first connecting node 310 and a second connecting node 312. Also, the first string 302 may include a first branch 314 operatively coupled to a second branch 316 via a third connecting node 318. Moreover, the first branch 314 may include a first portion 320 operatively coupled to a first controllable semiconductor switch 322 via the first connecting node 310 and a first inductor 326. Similarly, the second branch 316 may include a second portion 324 operatively coupled to a second controllable semiconductor switch 328 via the second connecting node 312 and a second inductor 329. The third connecting node 318 may be operatively coupled to a third bus 330. Furthermore, the second string 304 may include a third controllable semiconductor switch 332 operatively coupled to a fourth controllable semiconductor switch 334 via an AC phase 336.

Moreover, in the present example of FIG. 2, the third bus 330 may be direct current bus and more particularly, a middle DC bus which may be at a negative potential with respect to the first bus 306 and at a positive potential with respect to the second bus 308. In one embodiment, the middle bus may be floating or grounded or a high impedance grounded bus. In the example of FIG. 2, the controllable semiconductor switches 322, 328, 332, 334 may include partially controllable semiconductor switches. However, in another embodiment, the controllable semiconductor switches may include fully controllable semiconductor switches. Moreover, the controllable semiconductor switches may include a combination of partially controllable semiconductor switches and fully controllable semiconductor switches. The controllable semiconductor switches shown in FIG. 2 are only for representative purpose and any other switches which can make or break a connection between respective nodes may also be used in other embodiments. For example, in one embodiment, each of controllable semiconductor switches 332 and 334 may be replaced with a plurality of series connected controllable semiconductor switches as long as they all connect and disconnect together and meet other operating characteristics.

In addition, the first portion 320 and the second portion 324 of the first string 302 may include a plurality of switching units 334. The switching unit 334 may be a combination of a plurality of fully controllable semiconductor switches and an energy storage device. The fully controllable semiconductor switches may include an insulated gate bipolar transistor (IGBT), a metal oxide semiconductor field effect transistor (MOSFET), a field effect transistor (FET), a gate turn-off thyristor, an insulated gate commutated thyristor (IGCT), an injection enhanced gate transistor (IEGT), a silicon carbide based switch, a gallium nitride based switch, a gallium arsenide based switch, or equivalents thereof.

Figure 3:
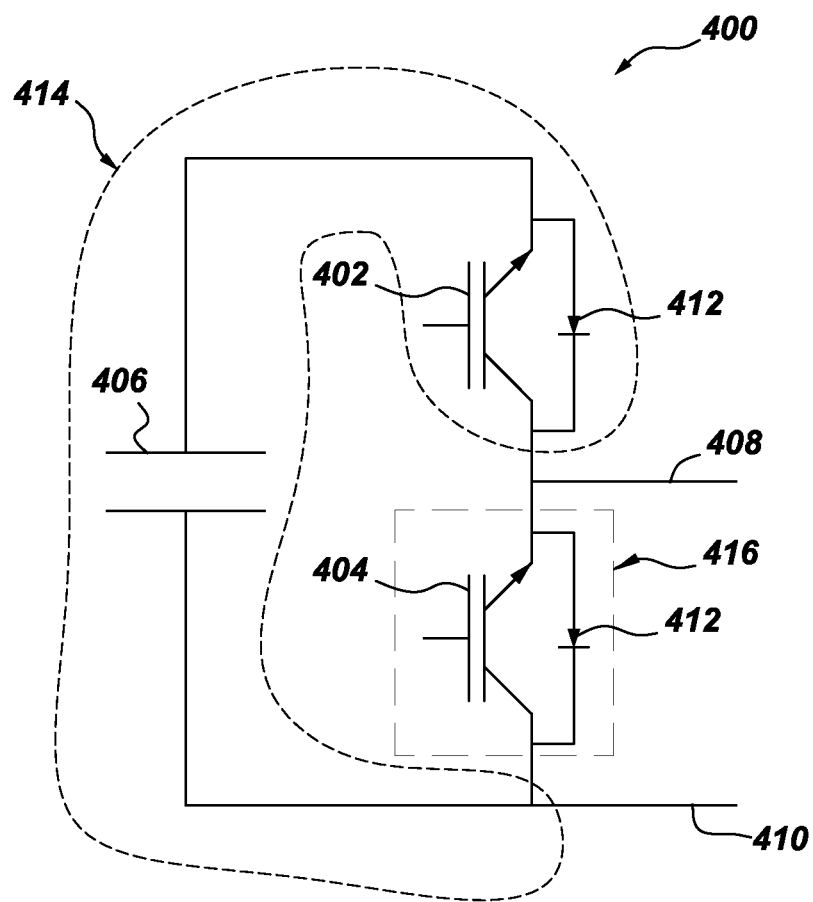
FIG. 3 is a diagrammatical representation of an exemplary embodiment of a switching unit for use in the portion of the power converter of FIG. 2, according to aspects of the present disclosure.

Referring now to FIG. 3, diagrammatical representation 400 of an exemplary embodiment of a switching unit such as the switching unit 320 or 324 of FIG. 2 for use in the leg 300 of FIG. 2, is depicted. In the presently contemplated configuration, the switching unit 400 may be referred to as a half bridge converter and includes fully controllable semiconductor switches 402 and 404, an energy storage device 406, a first connector 408, and a second connector 410. As previously noted, the fully controllable semiconductor switches 402, 404 may include an IGBT, a MOSFET, a FET, an IEGT, a gate turn-off thyristor, an IGCT, a silicon carbide based switch, a gallium nitride based switch, a gallium arsenide based switch, or equivalents thereof. Moreover, each of the fully controllable semiconductor switches 402, 404, may also include a power diode 412 that may be inbuilt and antiparallel to the fully controllable semiconductor switches 402 and 404. The inbuilt power diodes 412 may provide a freewheeling path. These power diodes 412 may also be referred to as freewheeling diodes.

Also, in one non-limiting example, the energy storage device 406 may include a capacitor. In the example of FIG. 3, the fully controllable semiconductor switch 402 may be operatively coupled in series to the energy storage device 406 to form a first limb 414. Also, the other fully controllable semiconductor switch 404 forms a second limb 416. The second limb 416 may be operatively coupled in parallel to the first limb 414. Additionally, the first limb 414 and the second limb 416 may be operatively coupled between the first connector 408 and the second connector 410. Although the example of FIG. 3 depicts the switching units 400 in a half bridge converter configuration as including two fully controllable semiconductor switches, and one energy storage device, use of other numbers of fully controllable semiconductor switches 402, 404, and energy storage devices 406 is also contemplated. In one embodiment, some or all of the switching units may be arranged to form a full bridge converter configuration as will be described in FIG. 4.

Furthermore, in one non-limiting example, when the fully controllable semiconductor switch 402 is activated and the fully controllable semiconductor switch 404 is deactivated, the energy storage device 406 may appear across the first connector 408 and the second connector 410. Consequently, the charge across the energy storage device 406 appears as a voltage across the first connector 408 and the second connector 410. Alternatively, when the fully controllable semiconductor switch 404 is activated and the fully controllable semiconductor switch 402 is deactivated, the first limb 414 is bypassed, thereby providing zero voltage across the first connector 408 and the second connector 410. Hence, by controlling the switching of the fully controllable semiconductor switches 402 and 404 in the plurality of switching units 324 on the first string 302 of FIG. 2, the voltage developed across the first string 302 may be regulated.

Figure 4:
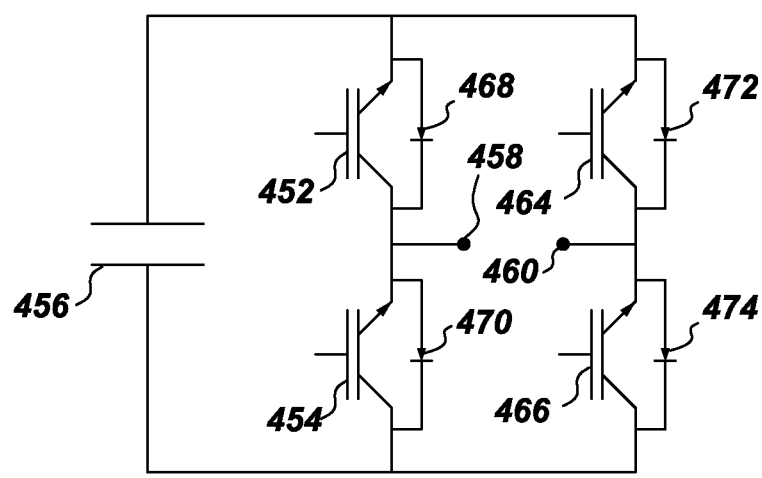
FIG. 4 is a diagrammatical representation of another embodiment of a switching unit for use in the portion of the power converter of FIG. 2, according to aspects of the present disclosure; operating states of a leg of a power converter.

Referring now to FIG. 4, diagrammatical representation 450 of an alternative embodiment of switching unit 320 or 324 of FIG. 2 is depicted. In the presently contemplated configuration, the switching unit 450 may be referred to as a full bridge converter and may include fully controllable semiconductor switches 452, 454, 464 and 466, an energy storage device 456, a first connector 458, and a second connector 460. As previously noted, the fully controllable semiconductor switches 452, 454, 464 and 466 may include an IGBT, a MOSFET, a FET, an IEGT, a gate turn-off thyristor, an IGCT, a silicon carbide based switch, a gallium nitride based switch, a gallium arsenide based switch, or equivalents thereof. Moreover, each of the fully controllable semiconductor switches 452, 454, 464, 466, may also include a power diode 468, 470, 472 or 474 respectively that may be inbuilt and antiparallel to the fully controllable semiconductor switches. As can be seen, compared to switching unit 400 of FIG. 3, switching unit 450 includes two additional fully controllable semiconductor switches and an output of switching unit 450 appears across first connector 458 and second connector 460. In one embodiment, fully controllable semiconductor switches 452, 454, 464, 466 are controlled to regulate a voltage across first connector 458 and second connector 460. Contrary to switching unit 400, switching unit 450 can produce 3 voltage levels across first connector 458 and second connector 460. The three voltages levels would be a zero voltage level and positive and negative polarity voltage levels, wherein the positive and the negative polarity voltage levels represent a charge across energy storage device 456.

Turning now to FIGS. 5(a)-5(c), diagrammatical representations 500 of different operating states of a leg of a power converter, such as the leg 300 of FIG. 2, according to the aspects of the present disclosure, are depicted.

Referring to FIG. 5(a), a diagrammatical representation of a leg 502, such as the leg 300 of FIG. 2, in a first operating state is presented. The first operating state may also be referred to as a negative state. The leg 502 may include a first string 504 and a second string 506. Also, the leg 502 may be operatively coupled between a first bus 508 and a second bus 510. As noted hereinabove, the first bus 508 may include a positive DC bus and the second bus 510 may include a negative DC bus. Furthermore, the first string 504 may be operatively coupled to the second string 506 via a first connecting node 512 and a second connecting node 514.

In addition, a first portion, such as the first portion 320 of FIG. 2 of the first string 504 and a second portion, such as the second portion 324 of FIG. 2 of the first string 504 may be represented by voltage sources 516 and 518, respectively. As noted hereinabove, the first portion and the second portion of first string 504 may include a plurality of switching units (not shown). The first portion of the first string 504 i.e., voltage source 516 is operatively coupled to a controllable semiconductor switch S1 via first connecting node 512 and a first inductor 513 and the second portion of the first string 504 i.e., voltage source 518 is operatively coupled to another controllable semiconductor switch S4 via second connecting node 514 and a second inductor 515. Also, the controllable semiconductor switches S1 and S4 may be coupled via a third connecting node 522, which may be operatively coupled to a third bus 524. Also, in the presently contemplated configuration the second string 506 includes two controllable semiconductor switches represented as $S_2$ and $S_3$ which are operatively coupled via an alternating current (AC) phase bus 520. Additionally, the voltage at the first bus 508 may be represented as $+V_{dc}$ and the voltage at the second bus 510 may be represented as $-V_{dc}$. By way of example, the voltage of $+V_{dc}$ at the first bus 508 and the voltage of $-V_{dc}$ at the second bus 510 may be with respect to a virtual ground. Also, the voltage at the third bus 524 may be represented as $V_{mid}$, and the voltage at the alternating current phase bus may be represented as $V_{ac}$. In one embodiment, the third bus 524 may be a ground bus, thus, making voltage $V_{mid}$ as zero.

As depicted in FIG. 5(a), during the negative operating state, the controllable semiconductor switches $S_1$ and $S_3$ are activated and conducting, while controllable semiconductor switches $S_2$ and $S_4$ are maintained at deactivated state. During this state, voltage source 516 supports a voltage between buses 508 and 524 whereas voltage source $V_n$ supports a voltage between buses 510 and 520. For example, if the voltage $V_{mid}$ at bus 524 is equal to zero and the voltage at bus 508 is equal to $+V_{dc}$ then voltage $V_p$ of voltage source 516 will need to support voltage $+V_{dc}$. Similarly, if the voltage at bus 520 is equal to $V_a$ and the voltage at bus 510 is equal to $-V_{dc}$ then voltage $V_n$ of voltage source 518 will need to support voltage $V_a+V_{dc}$. Voltage sources 516 and 518 will support the respective voltages by switching of the fully controllable semiconductor switches corresponding to the plurality of switching units in the first string 504, such as the switching units 320 and 324 of FIG. 2. It should be noted that the negative operating state refers to AC phase voltage $V_a$ being negative. Similarly, if AC phase voltage $V_a$ is positive then it would be referred to as positive operating state and if AC phase voltage $V_a$ is around zero then it would be referred to as zero operating state.

FIG. 5(b) is a diagrammatical representation 528 of a leg in a second or negative operating state. For ease of understanding, FIG. 5(b) is explained with reference to FIG. 5(a). In the second state, controllable semiconductor switches $S_2$ and $S_4$ are activated and are conducting, while controllable semiconductor switches $S_1$ and $S_3$ are deactivated and are not conducting. In this operating state, voltage source 516 will need to support a voltage across nodes 508 and 520 (e.g., $V_p=V_{dc}-V_a$) and voltage source 518 will need to support a voltage across nodes 510 and 524 (e.g., $V_n=V_{dc}+V_{mid}$).

Similarly, FIG. 5(c) is a diagrammatical representation 532 of a leg in a third or zero operating state. For ease of understanding, FIG. 5(c) is explained with reference to FIG. 5(a). Furthermore, in the third state, the controllable semiconductor switches $S_2$ and $S_3$ may be activated and are conducting, while the controllable semiconductor switches $S_1$ and $S_4$ are deactivated and are not conducting. In this operating state, voltage source 516 will need to support a voltage across nodes 508 and 520 (e.g., $V_p=V_{dc}-V_a$) and voltage source 518 will need to support a voltage across nodes 510 and 520 (e.g., $V_n=V_a+V_{dc}$). Although, FIGS. 5(a)-5(c) represent the three operating states with reference to a single leg, these three operating states may be employed simultaneously for a plurality of legs in a two phase power converter, a three phase power converter, and the like.

As depicted in FIGS. 5(a)-5(c) at any instant in time, each of voltage source 516 (i.e., first portion 320 of FIG. 2) and voltage source 518 (i.e., second portion 324 of FIG. 2) of the second string 504 is operatively coupled between the first bus 508 and third bus 524, between the third bus 524 and the second bus 510, or between bus 520 and first bus 508 or second bus 510. Hence, each of voltage sources 516 and 518 may have to withstand a maximum voltage of value about $V_{dc}$. Consequently, a desired number of total switching units together in voltage sources 516 and 518 may be less compared to a conventional modular multi-level converter.

Referring to FIG. 6, a diagrammatical representation 600 of an exemplary embodiment of a three phase multilevel converter, according to aspects of the present disclosure, is depicted. In a presently contemplated configuration, the three phase multilevel converter 600 includes three legs 626, 628, 630. Each leg may include a respective first and second string 602, 604.

Furthermore, the first string 602 includes a first branch 606 and a second branch 608 operatively coupled to each other via a third connecting node 618. Moreover, the first branch 606 may include a first portion 610 operatively coupled to a first controllable semiconductor switch 622 via a first connecting node 614 and a first inductor 615. Similarly, the second branch 608 may include a second portion 612 operatively coupled to a second controllable semiconductor switch 624 via a second connecting node 616 and a second inductor 617. Also, one end of the second string 604 may be operatively coupled to the first connecting node 614 of a respective first string 602, and the other end of the second string 604 may be operatively coupled to the second connecting node 616 of the same first string 602. In particular, one end of a first portion 610 of the first string 602 may be operatively coupled to the second string 602 via the first connecting node 614. In addition, one end of a second portion 612 of the first string 602 may be operatively coupled to the second string 604 via the second connecting node 616.

A third controllable semiconductor switch 632 of the second string 604 may be operatively coupled to a fourth controllable semiconductor switch 634 of the second string 604 via a fourth bus. The term fourth bus, as used herein, may be an alternating current (AC) phase. In particular, each of the three legs 626, 628, 630 may be associated with at least one AC phase. In a non-limiting example, a three phase AC system may include an AC phase-A 636, an AC phase-B 638, and an AC phase-C 640. Additionally, a DC terminal may be formed by a combination of a first bus 620 and a second bus 642. Also, the AC phases, AC phase-A 636, AC phase-B 638, and AC phase-C 640 in combination may form an AC terminal. Furthermore, first bus 620 is a positive DC bus whereas second bus 642 is a negative DC bus. The power flow in power converter 600 may be from the DC terminal to the AC terminal or vice versa.

In addition, in one embodiment, the third connecting node 618 may be the middle point of the first string 602. Furthermore, in one example, the third connecting nodes 618 of each of the three first strings 602 may be operatively coupled to each other to form a floating point. In another embodiment, the third connecting nodes 618 of each of the three first strings 602 may be operatively coupled to a third bus 644. The third bus 644 is a middle bus which may be floating or grounded or a high impedance grounded bus. However, in another embodiment, for applications in machine drives, the third connecting nodes 618 of each of the three first strings 602 may be operatively coupled to a neutral bus. Moreover, the three legs 626, 628, 630 may be operatively coupled between the first bus 620 and the second bus 642.

Furthermore, the power converter 600 may be operatively coupled to a controller such as the controller 108 of FIG. 1. As previously noted, the first strings 602 may include a plurality of switching units such as half bridge or full bridge converters and controllable semiconductor switches, while the second strings 604 may include a plurality controllable semiconductor switches. The controller may be configured to control the switching of the plurality of switching units in the first strings 602 and controllable semiconductor switches in first strings 602 as well as second strings 604. In one example, the switching of the switching units in the first strings 602 may be based on a modulation technique. The modulation technique may include pulse width modulation technique, space vector modulation, and the like. Moreover, the controller may be configured to aid in the generation of a direct voltage across first bus 620 with respect to the second bus 642. Also, the controller may be configured to balance and regulate energy stored in the first string 602 during a line cycle. Accordingly, the controller may be configured to ensure that an average power of a first string 602 during one line cycle is zero. The term line cycle, as used herein, may be an AC voltage cycle. In one embodiment, the controller may be disposed at a remote location.

Referring to FIG. 7, a diagrammatical representation 700 of a transition of a converter leg such as leg 300 of FIG. 2 from a negative operating state to a zero operating state, according to the aspects of the present disclosure, is depicted. For ease of understanding, FIG. 7 will be described with respect to FIGS. 5(a)-5(c) and 6. FIG. 7 shows three states, a negative operating state 702, a transient state 704 and a zero operating state 706. In the negative operating state 702, as discussed earlier, controllable semiconductor switches S1 and S3 are activated and controllable semiconductor switches S2 and S4 are deactivated whereas in zero operating state 706, controllable semiconductor switches S2 and S3 are activated and controllable semiconductor switches S1 and S4 are deactivated. Thus, to transition from positive operating state 702 to zero operating state 706, first controllable semiconductor switch S1 which was activated during the negative operating state 702 is deactivated as shown in transient state 704. This results in the current through S1 being reduced to and maintained at zero. Thus, controllable semiconductor switch S1 can be fully turned-off, even though a partially controllable device, such as Thyristor is used. Thereafter controllable semiconductor switch S2 which was deactivated during the negative operating state 702 is deactivated as shown in zero operating state 704. Furthermore, it should be noted that to deactivate or turn off controllable semiconductor switch S1 a circulating current between two phases (i.e., between two legs) may be utilized and thus, no negative voltage from the same leg is needed.

Referring to FIG. 8, a diagrammatical representation 800 of a transition of a converter leg such as leg 300 of FIG. 2 from a zero operating state to a positive operating state, according to the aspects of the present disclosure, is depicted. For ease of understanding, FIG. 8 will be described with respect to FIGS. 5(a)-5(c) and 6. FIG. 8 shows three states, a zero operating state 802, a transient state 804 and a negative operating state 806. In the zero operating state 802, as discussed earlier, controllable semiconductor switches S2 and S3 are activated and controllable semiconductor switches S1 and S4 are deactivated whereas in negative operating state 806, controllable semiconductor switches S2 and S4 are activated and controllable semiconductor switches S1 and S3 are deactivated. Thus, to transition from zero operating state 802 to positive operating state 806, first controllable semiconductor switch S3 which was activated during the zero operating state 802 is deactivated as shown in transient state 804. Then the current through controllable semiconductor switch S3 is reduced and maintained at zero. Thus controllable semiconductor switch S3 can be fully turned off, even though a partially controllable device, such as Thyristor is used. Thereafter controllable semiconductor switch S4 which was deactivated during the zero operating state 802 is deactivated as shown in positive operating state 804. Furthermore, it should be noted that to deactivate or turn off controllable semiconductor switch S3 a circulating current between two phases (i.e., between two legs) may be utilized and thus, no negative voltage from the same leg is needed.

The various embodiments of the power converter and the methods of power conversion described hereinabove aid in developing multilevel power converters, thereby allowing generation of high power/voltage/current output. Furthermore, since the exemplary power converter utilizes about half number of switching units when compared to a conventional modular power converter, a system of lower cost may be provided. Also, use of partially controllable semiconductor switches such as thyristors in the power converter provides a less expensive system. Furthermore, use of the thyristors provides a power converter with substantially lower losses. In addition, the exemplary power converter may circumvent the need for additional capacitors in the DC link. The various embodiments of the power converter may find application in solar, wind, and other renewable power generation devices. Also, the power converter may be employed in non-renewable power generation systems like thermal power plants, hydroelectric power plants, and equivalents thereof. In addition, the power converter may be employed as a DC-AC converter or an AC-DC converter for use in HVDC transmission and distribution systems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A power converter, comprising:
   at least one leg, comprising:
   a first string comprising a first branch and a second branch each comprising at least two switching units and a controllable semiconductor switch, a first connecting node, and a second connecting node, wherein the first string is operatively coupled across a first bus and a second bus, and wherein the second branch is operatively coupled to the first branch via a third connecting node;
   a second string operatively coupled to the first string via the first connecting node and the second connecting node, wherein the second string comprises a plurality of controllable semiconductor switches;
   wherein each of the at least two switching units comprises a plurality of fully controllable semiconductor switches and at least one energy storage device; and
   wherein the at least two switching units and the controllable semiconductor switch in the first branch are connected to each other via the first connecting node and a first inductor and the at least two switching units and the controllable semiconductor switch in the second branch are connected to each other via the second connecting node and a second inductor.

2. The power converter of claim 1, wherein the plurality of fully controllable semiconductor switches comprises an insulated gate bipolar transistor, a metal oxide semiconductor field effect transistor, a field effect transistor, a gate turn-off thyristor, an insulated gate commutated thyristor, an injection enhanced gate transistor, a silicon carbide based switch, a gallium nitride based switch, a gallium arsenide based switch, or combinations thereof.

3. The power converter of claim 1, wherein the first bus comprises a positive direct current bus and the second bus comprises a negative direct current bus.

4. The power converter of claim 3, wherein the third connecting node is operatively coupled to a third bus.

5. The power converter of claim 4, wherein the third bus comprises a direct current bus.

6. The power converter of claim 1, wherein the second string comprises a first portion and a second portion.

7. The power converter of claim 6, wherein the first and second portions of the second string each comprise a controllable semiconductor switch and are operatively coupled to a fourth bus.

8. The power converter of claim 7, wherein the fourth bus comprises an alternating current phase.

9. The power converter of claim 1, wherein the plurality of controllable semiconductor switches comprises partially controllable semiconductor switches, fully controllable semiconductor switches, or a combination thereof.

10. A system for power conversion, comprising:
   a power source;
   a load;
   a first power converter, comprising:
   one or more legs, wherein each of the one or more legs comprises:
   a first string comprising a first branch and a second branch each comprising at least two switching units and a controllable semiconductor switch, a first connecting node, and a second connecting node, wherein the first string is operatively coupled across a first bus and a second bus, and wherein the second branch is operatively coupled to the first branch via a third connecting node;
   a second string operatively coupled to the first string via the first connecting node and the second connecting node, wherein the second string comprises a plurality of controllable semiconductor switches;

a controller configured to control switching of the plurality of controllable semiconductor switches and the plurality of switching units;

wherein each of the at least two switching units comprises a plurality of fully controllable semiconductor switches and at least one energy storage device; and wherein the at least two switching units and the controllable semiconductor switch in the first branch are connected to each other via the first connecting node and the at least two switching units and the controllable semiconductor switch in the second branch are connected to each other via the second connecting node.

11. The system of claim 10, wherein the load comprises a grid, an electrical appliance, or a combination thereof.

12. The system of claim 10, wherein the controller is further configured to regulate energy stored in the second string during a line cycle.

13. The system of claim 10, wherein the each of the at least two switching units comprise a half bridge converter, a full bridge converter, or a combination thereof.

14. The system of claim 10, wherein the second string comprises a first and a second portion each comprising a controllable semiconductor switch and are operatively coupled to a fourth bus.

15. A system for power conversion, comprising:
a power source;
a load;
a first power converter, comprising:
one or more legs, wherein each of the one or more legs comprises:
a first string operatively coupled between a first bus and a second bus, wherein the first string comprises a first branch and a second branch each comprising at least two switching units and a controllable semiconductor switch, a first connecting node, and a second connecting node, wherein the second branch is operatively coupled to the first branch via a third connecting node, and wherein the third connecting nodes of the one or more legs are operatively coupled to each other;
a second string operatively coupled to the first string via the first connecting node and the second connecting node, wherein the second string comprises a plurality of controllable semiconductor switches;
a controller configured to control switching of the plurality of controllable semiconductor switches and the at least two switching units;
wherein each of the at least two switching units comprises a plurality of fully controllable semiconductor switches and at least one energy storage device; and
wherein the at least two switching units and the controllable semiconductor switch in the first branch are connected to each other via the first connecting node and the at least two switching units and the controllable semiconductor switch in the second branch are connected to each other via the second connecting node.

16. The system of claim 15, wherein the third connecting nodes of the one or more legs are operatively coupled to a third bus.

17. The power converter of claim 1, wherein the at least two switching units are connected in series.

* * * * *